United States Patent

Smith

[15] 3,686,943
[45] Aug. 29, 1972

[54] MEASURING APPARATUS FOR ATTACHING TO A CONDUIT IN A BOREHOLE

[72] Inventor: William D. Smith, Forth Worth, Tex.

[73] Assignee: Go International, Inc., Fort Worth, Tex.

[22] Filed: Dec. 10, 1970

[21] Appl. No.: 96,899

[52] U.S. Cl. .................................................. 73/151
[51] Int. Cl. .............................................. E21b 47/00
[58] Field of Search ...................................... 73/151

[56] References Cited

UNITED STATES PATENTS

2,530,309   11/1950   Martin ........................ 73/151
3,006,186   10/1961   Berry .......................... 73/151

Primary Examiner—Jerry W. Myracle
Attorney—Wofford and Felsman

[57] ABSTRACT

Apparatus for attaching to a conduit at a depth in a borehole, as in free point indicator tools, characterized by a plurality of aspects. In a first aspect, the apparatus has individual, non-flow restricting attachment members that are operable to engage the conduit any number of times on a trip into the well with a force sufficient to bear the weight of the tool and any sinker bars and cable resting thereon. In a second aspect, the force is controlled electrically from the surface with a current limiter and a downhole electric motor is run to stall. In a third aspect, the attachment members are connected with the downhole motor via a shear pin so the pin can be sheared to release the attachment members in the event of power failure. In a fourth aspect, the downhole, or borehole tool has a sensor section with an automatic centralizer for effecting a neutral position of the two movable portions for detecting small rotational or longitudinal movement therebetween. Also disclosed are specific structures and methods that are advantageously employed in measuring the depth at which a conduit such as drill pipe is stuck in the borehole.

14 Claims, 12 Drawing Figures

Patented Aug. 29, 1972

INVENTOR
William L. Smith
BY
Woodard & Felsman
ATTORNEYS

Patented Aug. 29, 1972 3,686,943

INVENTOR
William D. Smith
BY
ATTORNEYS

MEASURING APPARATUS FOR ATTACHING TO A CONDUIT IN A BOREHOLE

BACKGROUND OF THE INVENTION

1. Field of the Invention: This invention relates to apparatus for releasably attaching to a conduit at a depth in a borehole. In a particular embodiment, this invention relates to improvements in a downhole tool for locating the point at which pipe is stuck in a borehole.

2. Description of the Prior Art: A wide variety of apparata have been employed for releasably connecting a downhole tool with a conduit for a variety of purposes. One significant purpose for which a downhole tool is connected with a conduit in a borehole is for determining the location at which the pipe is stuck in the borehole. For example, drilling pipe is frequently stuck in a borehole by cave-ins from the sides of the borehole. The depth at which the pipe is stuck is determined by a tool called a "free point indicator". There are presently two general types of methods and apparatus employed in these free point indicators. In one type, a magnetic method and apparatus is employed and a magnetic field is linked to a portion of the wall of the pipe in the borehole, force is applied to the pipe, and the changes in the characterictics of the magnetic field are noted at the surface to give indication of the stress response of the pipe. The stress response is determined, in part, by whether the pipe is free to strain at that location in the well or whether it is stuck at a location above that depth such that it does not respond to stress induced at the surface. Such methods and apparatus are generally disclosed in patents such as the Bender U.S. Pat. Nos. 2,686,039 and 2,814,019.

The second type of apparatus includes apparatus for removably attaching movable portions of a sensor to spaced apart points along the pipe and inducing or changing the stress in the pipe at the surface. The response of the pipe is indicative of whether the pipe is stuck above or below the depth at which the downhole tool is affixed to the spaced points. Specifically, if a differential movement of the points and portions of the sensor occurs, the pipe is stuck below the depth; if not, the pipe is stuck above the depth. Such method and apparatus are generally disclosed in patents such as the Martin U.S. Pat. Nos. 2,530,309 and 2,530,308; and the Brookes U.S. Pat. No. 2,550,964. Improved, or refined, measurement techniques have been employed, as described by Rogers in U.S. Pat. No. 3,095,736.

None of the prior art devices have been totally satisfactory, since the structure with which the downhole tool was connected with the conduit was generally of the bow spring type and limited the ready movement of the tool longitudinally of the pipe, or conduit, in the borehole. Downward movement required heavy sinker bars. The bow springs did not always retain the tool in engagement with the conduit, since they were prone to slip when the weight of the heavy sinker bars or cable was imposed onto the tool. Consequently, the small strain, or movement, of the conduit was not always transmitted to the respective portions of the tool such that the sensor could sense the differential strain, or response, of the conduit to stress induced at the surface. The prior art free point indicator tools of which we are aware employed slip joints to enable an operator at the surface to relieve the weight of the tool suspending cable and any sinker bars from the tool, as a prerequisite to the measuring or sensing operation of the tool. Such slip joint apparatus is subject to a number of disadvantages which the present invention obviates.

It is desirable that a downhole tool such as the free point indicator have the following features in its attachment means for attaching it with the conduit:

1. the downhole tool should have attachment means that is operable to retract and engage retractible attachment members with the conduit at a predetermined depths any number of times in a single trip into the borehole with the attachment means being remotely controlled from the surface and adapted to provide an attachment force that is sufficient to bear the weight of the sinker bars and any cable means that bear on the downhole tool, the attachment members themselves being substantially non-restrictive to the flow of fluids therepast, whether retracted of extended in engagement with the conduit;

2. the attachment means should have means for employing a variable force in setting the attachment members and ensuring that the attachment members continue to engage the conduit with the force, thereby ensuring adequate force of engagement without structural damage; and 3. attachment members that engage the conduit with sufficient force but that are arranged and structurally connected such that the tool can be pulled from the conduit in the event of failure of the power to the attachment means.

Moreover, the free point indicators of the prior art did not provide an automatic centralizer means in the sensing means, but relied upon the skilled operator to ready the borehole tool for taking a measurement; in conjunction, for example, with the lifting of the sinker bars. Thus, the readying of the tool had to provide a neutral location such that the portions of the sensing means would not be positioned at an extreme position but be free to accommodate relative movement and reflect the differential strain exhibited by the conduit in response to induced differential stress.

BRIEF DESCRIPTION OF THE DRAWINGS

FIG. 1 is a schematic side elevational view of one embodiment of this invention.

FIGS. 3 and 4 are, respectively, side and top cross sectional views of the automatic centralizer of the embodiment of FIG. 2.

FIG. 5 is a partial isometric view, partly in section, of the sensor employed in the sensing means of FIG. 2.

FIG. 7 is a cross sectional view taken along the lines VII — VII of FIG. 6a.

FIG. 8 is an isometric view of the attachment members of the embodiment of FIG. 1.

FIG. 9 is a partial isometric view of the motor, screw and shaft connected with the attachment members in the embodiment of FIGS. 6 and 6a.

FIG. 10 is an electrical schematic diagram of the embodiment of FIG. 1.

DESCRIPTION OF PREFERRED EMBODIMENTS

It is an object of this invention to provide method and apparatus that obviates the disadvantages of the prior art method and apparatus and provide one or more of the features indicated to be desirable hereinbefore and not heretofore provided by the prior art.

Since this invention is particularly useful with free point indicators and the structure and operation can be clearly understood in that context, the following descriptive matter will set forth the various aspects and embodiments of the invention in the context of free point indicators for determining the point at which a conduit is stuck in a borehole penetrating subterranean formations.

Figures 1, 3:
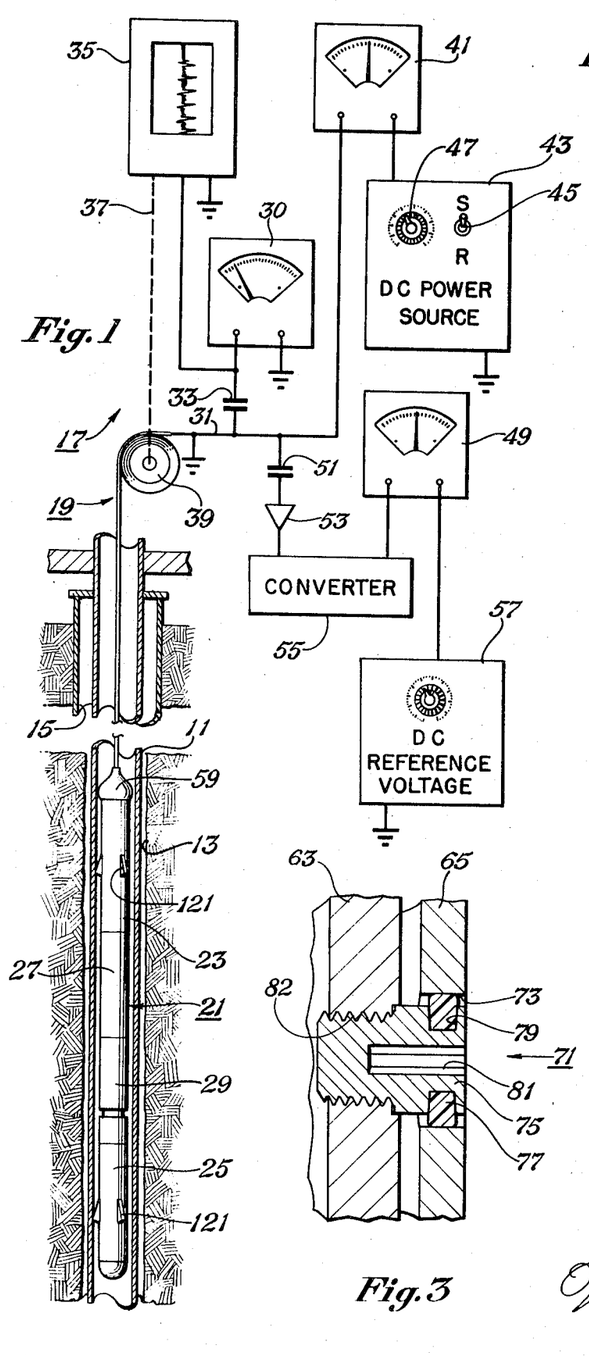

Referring to FIG. 1, the apparatus is being employed as a free point indicator in conduit 11 such as drill pipe suspended in borehole 13. As is well known, the borehole 13 may have one or more upper strings of casing 15 for protection of fresh water sands near the surface. The conduit 11 may be suspended by appropriate means from a drilling rig for effecting the desired stress and the resulting strain of the conduit in order to determine the point at which it is stuck in the borehole. The stress may be a longitudinal stress effected by upward pulling on a hook and traveling block holding a swivel and kelly with which the conduit 11 is connected on a drilling rig. Alternatively, torsional, or rotational, stress may be induced by a suitable rotary table, or turntable, on the drilling rig.

In general, the apparatus comprises the major assemblies or elements of surface equipment 17, cable means 19 and the borehole tool 21. The borehole tool 21, in turn, comprises the major assemblies or elements of the upper and lower portions 23 and 25 with their respective attachment means, collar locator 27 and sensing means 29.

The surface equipment 17 has a first monitoring means for the collar locator in the form of volt meter 30 that is connected with conductor 31 via blocking capacitor 33. The volt meter 30 is also connected with electrical common, or ground. If desired, a recorder 35 may be connected in parallel with volt meter 30 to record the collars as a function of depth. As indicated via dashed line 37, the recorder 35 is moved responsively to the depth from the depth measuring means 39.

A second monitoring means is serially connected with an attachment control means in the surface equipment and with a power means of the attachment means in the borehole tool. Specifically, an ammeter 41 is serially connected with conductor 31 and with direct current (DC) power source 43 for monitoring the current supplied to electric motors in the attachment means of the borehole tool 21. The DC power source has a reversing switch 45 for effecting a forward or reverse rotation of the electric motors in the attachment means in the respective upper and lower portions 23 and 25. The DC power source also has a rheostat 47 for controlling the magnitude of the current which will be supplied to each motor in the respective attachment means. Expressed otherwise, rheostat 47 serves as a current limiter means for limiting the current that is supplied to the motors in the attachment means.

A third monitoring means is provided for monitoring the output from the sensing means 29 to determine whether or not there is small relative, or differential, movement between the portions of the sensing means, indicating that the conduit is being strained in response to a stress induced at the surface. Specifically, DC volt meter 49 is serially connected with conductor 31 via blocking capacitor 51, amplifier 53 and converter 55. The DC volt meter 49 is also serially connected with ground via a DC reference voltage supply 57. The converter 55 is a device such as a rectifying counter for converting the output of an oscillator to a proportional direct current signal level. The direct current volt meter 49 reads the differential DC level due to measurement by the sensing means in borehole tool 21. The DC reference voltage is adjustable to balance or null out the converter DC voltage immediately prior to making a measurement.

The cable means 19 may be any one of the plurality of conventional cables. The cable means will have at least one conductor such as conductor 31 serially connected with the surface equipment 17 and the downhole tool 21. It will also have a ground such as an armored sheath as indicated by the ground symbol. On the other hand, the cable may a coaxial cable having a plurality of conductors that are shielded to preserve fidelity of the downhole signals.

The borehole tool 21 has an elongate body means that comprises a plurality of tubular sections for housing respective subassemblies, and is adapted for traversing along the longitudinal axis of the conduit 11. The borehole tool 21 has a cable attachment means such as cable head 59 at its upper end for physically and electrically connecting with the cable means 19. The upper portion 23 is connected to the cable head 59, as by threaded connection with appropriate electrical connector plugs and sockets. The collar locator 27 is connected with the upper portion 23 by conventional means such as a threaded connection. The sensing means 29 is serially connected at one end with the upper portion 23 via the collar locator 27 and at the other end with the lower portion 25. As indicated, the upper and lower portions have respective attachment means for releasably effecting a connection with the conduit 11 such that the sensing means 29 can detect any small movement resulting from strain of the conduit 11.

Figure 2:
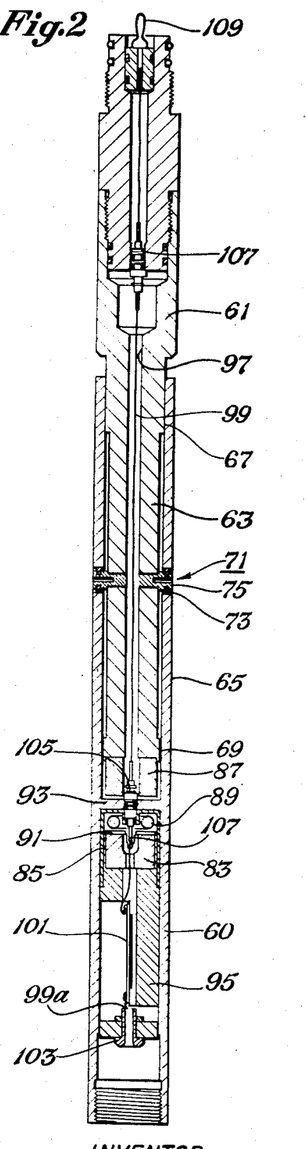
FIG. 2 is a cross sectional view of a sensing means in accordance with one embodiment of this invention.
Figures 6, 6A:
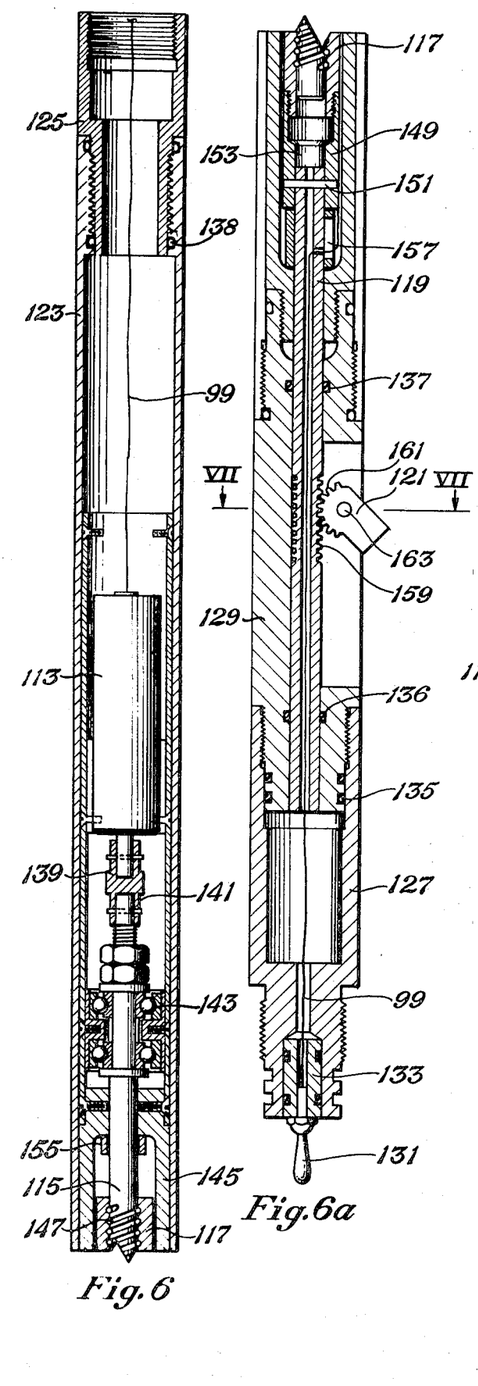
FIGS. 6 and 6a are side cross sectional views of an attachment means in accordance with one embodiment of this invention.

The sensing means 29 is the heart of a free point indicator and is illustrated in cross section in FIG. 2. As can be seen, in FIG. 2 the sensing means is inverted with respect to the illustration of FIG. 1 and with respect to the respective upper and lower portions, as illustrated in FIGS. 6 and 6a. A first portion 60 is connected with the upper portion 23 via collar locator 27 so as to move concomitantly therewith. A second portion 61 is connected with the lower portion 25 of the body means so as to move concomitantly therewith. The first and second portions 60 and 61 have portions such as the rod member 63 and tubular member 65 that are at least partially coextensive longitudinally of the borehole tool 21. The rod member 63 is adapted to move within the tubular member 65 either longitudinally or rotationally. The rod member 63 has enlarged cylindrical sections 67 and 69 at its respective ends for conformingly guiding it within tubular member 65.

An automatic centralizer means 71 is provided to effect a neutral position when a force other than gravity is released. By automatic centralizer means is meant a means that urges the rod member 63 and the tubular member 65 toward a neutral, or central, position. By neutral position is meant a position, away from any limits, that will allow relative movement, longitudinally or rotationally, between the rod and tubular members 63 and 65. The neutral position may not always be the same relative position, but does allow relative movement and hence measurement without the necessity for physical manipulation of the borehole tool by action of the operator at the surface in order to ready the borehole tool for measurement. The automatic centralizer means 71 comprises a first limit means carried by the first portion 60, a second limit means carried by the second portion 61, and a resilient means interconnecting the first and second limit means and urging the first and second portions of the sensing means toward a neutral position. The limit means may take any suitable form; such as, interlocking shoulder means, shoulder and groove means, or aperture and protrusion means. The resilient means may take any suitable form; such as, elastomeric washers or metallic resilient means like cupped metal star washers, star springs, coil spring arrangements or opposed and balancing springs. The automatic centralizer means 71 illustrated in FIGS. 2–4 has been found particularly advantageous.

Figures 4, 5, 7, 8, 10:
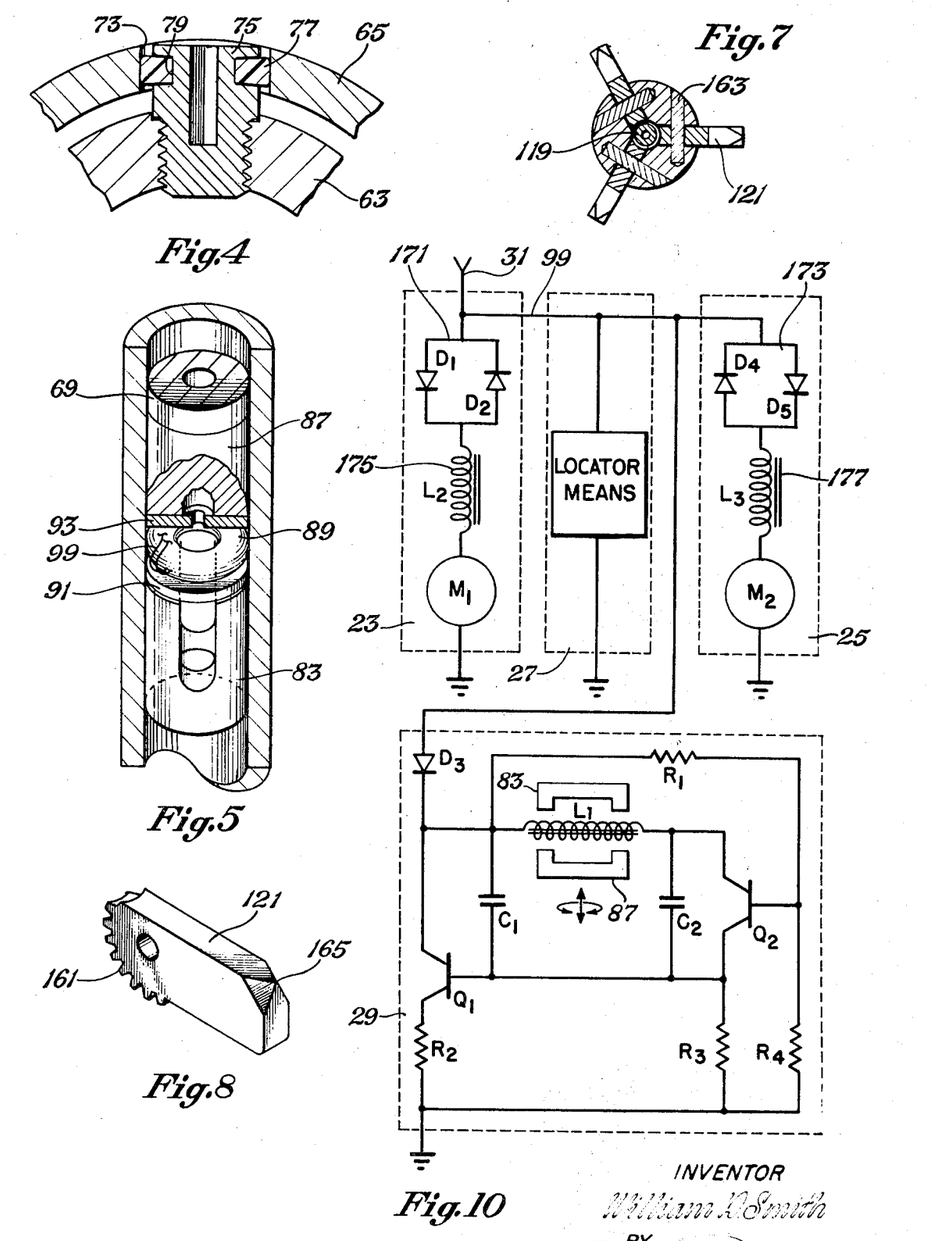

Referring to FIGS. 2–4, the automatic centralizer means 71 comprises a set of at least one aperture 73 in one of the portions of the sensing means and a protrusion means such as stud 75 disposed within the aperture 73 and carried by the other of the portions of the sensing means. As illustrated, the aperture 73 is disposed in the tubular member 65 and the stud 75 is carried by the rod member 63. The stud 75 is smaller in cross sectional dimensions than is the aperture 73, thereby defining an annular passageway about the stud. Thus, the stud may move responsively to movement of the rod member 63, either longitudinally of the tubular member 65, or rotationally with respect thereto. A resilient means 77 is disposed in the annular passageway and concentrically intermediate the stud 75 and the aperture 73. The resilient means 77 is disposed in a concentric annular groove means 79 about the periphery of stud 75 so as to be held at a predetermined location longitudinally of the stud 75 and within the aperture 73. The resilient means 77 has a resiliency sufficient to return the stud 75 to a neutral position when stress other than gravity is released. For example, the stress may be induced by movement of the attachment means in contact with the conduit when stress is induced onto the conduit at the surface. The stud 75 is screwed into a threaded aperture 82 in the rod member 63, although any other means of rigidly interconnecting the two may be employed. An allen head recess 81 is provided to facilitate screwing the studs 75 into or out of their respective threaded apertures 82 in the rod member 63. A preferred form of the resilient means 77 comprises a rubber washer that has a durometer hardness of about 80.

The sensor, or detector, of the sensing means is illustrated in FIGS. 2 and 5. The sensor may comprise any one of the conventional sensors described in the prior art. The sensor does not, per se, form a part of this invention and needs only a brief description. A permanent magnet 83 is fixedly held in place by chassis 95 within a barrel 85 within the first portion 60. A movable magnet 87 is rigidly connected with the cylindrical section 69 of the rod member 63 so as to move in response thereto. A sensing coil 89 is disposed between the magnets 83 and 87 to sense the change in magnetic flux effected by relative movement of the movable magnet 87. The sensing coil 89 is maintained in spaced apart relationship with fixed magnet 83; and is separated from the fixed magnet 83 by disc 91. The sensing coil 89 and fixed magnet 83 move together and concomitantly with tubular member 65. The sensing coil 89 is separated from the movable magnet 87 by the end 93 of the interior cylindrical cavity of the cylindrical member 65.

A passageway 97 traverses longitudinally of all of the elements of the sensing means, as well as other elements of the borehole tool 21, in order that suitable electric conductors 99 may be provided. The conductor 99 is at least connected with the conductor 31, and may be the same conductor. A circuit board assembly 101 is provided and is connected with the conductor 99 at each end. The conductor 99a is connected with the connector socket 103, for electrical connection with the collar locator 27. Suitable connectors 105 and 107 are serially connected with the conductor 99 to provide continuity in the electrical circuit. A connector plug 109 is provided at the end opposite the connector socket 103 to facilitate making electrical connection with the adjacent subassemblies; such as, the lower portion 25.

As indicated hereinbefore, the upper and lower portions 23 and 25 have attachment means for being temporarily connected with the conduit in the wellbore. At least one of the attachment means in the upper and lower portions comprises an attachment means as illustrated in FIGS. 6 and 6a and described hereinafter. That is, the attachment means is operable to frictionally engage an attachment member with the conduit with a force sufficient to effect responsive movement; such as, rotational or longitudinal movement; of the respective portion concomitantly with movement of the conduit at the engaging location. As indicated hereinbefore, the force must support the weight in the borehole fluids of the tool, the sinker bars and any cable that rests thereon. This amount of weight will comprise the excess weight over that of the borehole fluid displaced by the borehole tool 21 in order to effect downward movement of the tool in the borehole fluids. The attachment means is remotely controlled from the surface. The attachment members are not restrictive to the flow of fluid therepast. As illustrated, the attachment means comprises a motor 113; screw 115; and screw housing 117 and shaft 119 for translating rotational movement of the motor into reciprocal movement of the shaft. The attachment means also includes pivotally mounted attachment members; such as, the illustrated foot 121; that are responsively mounted so as to translate the longitudinal movement of shaft 119 into movement of an end outwardly into engagement with the wall of the conduit. The attachment means is carried by housing 123 intermediate upper and lower subs 125 and 127 respectively. The feet 121 adjacent the shaft 119 are disposed within a body leg 129. The lower sub has an electrical connector plug 131 and insulator 133 for electrical continuity of the electrical conductor 99 traversing the tool. Suitable seals such as o-rings 135–138 are employed at propitious points; such as, adjacent the shaft 119 and the upper and lower subs 125 and 127 to seal against the invasion of borehole fluids into the tool.

Figure 9:
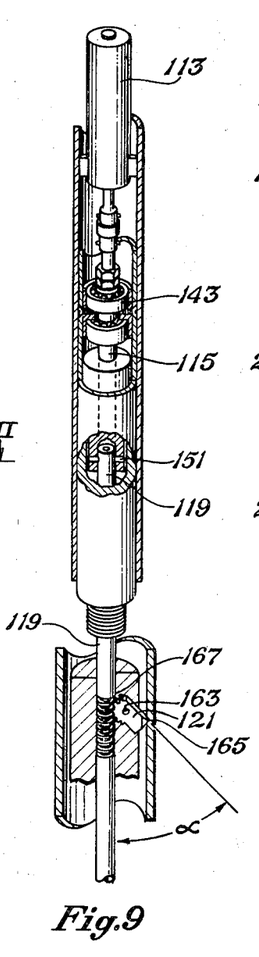

The motor 113 is a permanent magnet, DC motor that can be run to stall in either direction to hold a force. The motor 113 effects dynamic braking. Such motors are commercially available; for example, from the Globe Division of Thomas Ramo Woolridge, Inc., Dayton, Ohio, type SS with a planetary gear. The motor 113 is mounted at a fixed location longitudinally of the housing 123 as can be seen in FIGS. 6 and 9. Motor 113 is connected with the screw 115 by way of motor coupling 139 and screw coupling 141. The screw 115 is journalled in bearings 143 to prevent lateral wobble during rotation. The screw 115 engages the screw housing 117 within the body nut 145. The body nut 145 guides the screw housing 117 to effect longitudinal movement of the screw housing in response to rotational movement of the screw. Specifically, the screw engages the screw housing by way of circulating ball bearings 147. Such a screw and screw bearing is referred to in the art as a bearing type lead screw and is commercially available; for example, from Beaver Precision Products, Inc. a subsidiary of Warner Electric Brake and Clutch Co., Troy, Mich., specification Beaver R-0308. These bearing type lead screws are characterized by high efficiency and relatively low power loss through friction. Consequently, the screw housing 117 is moved reciprocally in response to rotational movement of the shaft with a relatively high degree of efficiency.

The screw housing 117 is connected with a retainer nut 149. The retainer nut 149 is connected with the shaft 119 via shear pin 151. The shaft 119 is relatively freely movable within the central passageway 153 once the shear pin 151 is sheared. On the other hand, the shaft moves concomitantly and responsively with the screw housing 117 and retainer nut assembly 149 reciprocally and longitudinally of the respective portion of the borehole tool as long as the shear pin is not sheared. Suitable upper and lower spacers 155 and 157 are provided. The lower spacer 157 serves as a significant limit stop means for limiting the downward movement of the retainer nut and the screw housing assembly and, consequently, limiting the angle attained by the feet 121, as described hereinafter with respect to FIG. 9.

The shaft 119 carries a rack 159 that engages the gear 161 of the foot 121 for converting the longitudinal movement of the shaft 119 into pivotal movement of the feet 121. Each foot 121 is mounted for pivotal movement about its stub shaft 163, FIGS. 6a, 7 and 9. Any number of feet 121 may be employed. As illustrated, three feet 121 are employed for engaging the conduit at a given depth at points spaced 120° apart.

As can be seen in FIG. 9, the foot 121 is pivotally mounted with its free end 165 extending away from the cable head 59. Limit stop means; such as the lower spacer 157 about shaft 119; is provided to prevent the foot 121 from attaining an angle $\alpha$ with respect to the longitudinal axis of the shaft that is greater than 90°. The angle is retained less than 90° in order that, in the event of power failure, the tool may be pulled upwardly to shear the shear pin 151 and enable removing the borehole tool 21. Expressed otherwise, the shear pin 151 must be shearable at a force acting on the extremity of the feet 121 that is less than the maximum force that is sustainable by the cable and its associated connections such as the cable head 59. As can be seen in FIG. 8, the foot 121 has a pointed outer end 165 that may be faced with a hard material; such as, Stellite or silicon carbide; to repetively engage the conduit with the requisite force with a minimum of wear.

The diagram of the electrical interconnection of the components of downhole tool 21 is illustrated in FIG. 10. Because of the nature of the DC power to the motors in the borehole tool 21, and the signals from the collar locator 27 and the sensing means 29, all three can be conducted via a single conductor and ground. As illustrated therein, the downhole tool has its respective upper and lower portions 23 and 25 with their respective motors M1 and M2 for the respective attachment means serially connected with conductor 99 and with ground. Preferably, the motors M1 and M2 are the same as motors 113 of FIG. 6. The collar locator 27 is also serially connected with conductor 99 and with ground. Additionally, the sensing means 29 is serially connected with the conductor 99 and with ground. The conductor 99 is connected with the conductor 31.

The motors M1 and M2 are serially connected with the conductor 99 via respective isolator means 171 and 173 and respective inductance coils 175 and 177. The isolator means 171 and 173 each comprise parallel connected diodes such as D1 and D2. The isolator means allow the collar locator 27 to operate without interference from the motor circuitry when there is no voltage on the line. The inductance coils such as inductance coil 175 offers DC resistance, or choking, that isolates one motor from another when one motor stalls. Expressed otherwise, the resistance of the inductance coil keeps the stalled motor from absorbing all of the available DC power. Moreover, when making a measurement, the inductance coil, or choke, presents a high impedance to the oscillator signal and prevents the motor from absorbing or distorting the oscillator output signal.

The collar locator 27 is connected with the conductor 99 for impressing its detection of the change in the magnetic field as the borehole tool 21 passes respective collars, in the conventional manner that is well known in the art.

The sensing means 29 is connected with conductor 99 via diode D3. The diode D3 isolates the negative voltage from the oscillator in the sensing means, since the transistors Q1 and Q2 operate on a supply voltage of a given polarity such as positive voltage. The diode D3 is serially connected with ground via the collector and emitter of transistor Q1 and the current limiting resistor R2. Transistor Q1 serves as an amplifier to amplify the oscillations from a standard type oscillator such as a Colpitts oscillator. As is well known, the Colpitts oscillator employs a "tank" circuit, comprising capacitors C1 and C2 that are serially connected via inductance coil L1. The transistor Q2 serves as the oscillator transistor to keep the tank circuit oscillating. The resistors R1, R3 and R4 effect the appropriate biasing. The frequency with which the oscillator oscillates depends upon the magnetic field sensed by the inductance coil L1 intermediate permanent magnet 83 and the movable magnet 87. The inductance coil L1 comprises the sensing coil 89. The poles of the magnets as well as the distance of separation affects the magnetic flux sensed by the inductance coil L1. As the movable magnet 87 is moved, the magnetic flux changes about inductance coil L1 and intermediate the fixed magnet 83 and movable magnet 87. Consequently, the frequency with which the tank circuit oscillates is changed. The half wave of the oscillator signal passing diode D3 is transmitted via conductor 99 to the surface equipment 17. The change in the frequency of oscillation is then amplified and detected, as described hereinbefore, via amplifier 53, converter 55 and DC volt meter 49. The oscillator, including its tank circuit comprising capacitors C1 and C2 connected via inductance coil L1 and employing the oscillating transistor Q2, is well known in the art; does not, per se, comprise the invention; and requires no further description herein. It and satisfactory other oscillators are described adequately in standard texts.

In operation, the borehole tool 21, suspended via cable means 19 and connected via its associated conductors, as described hereinbefore, is lowered into the borehole to a predetermined depth. The depth is ordinarily the point at which it is desired to known whether or not a conduit such as conduit 11 is stuck in the borehole. At this point, the reversing switch 45 is moved to the set position, indicated by S, and the rheostat 47 turned to a predetermined scalar magnitude. The predetermined scalar magnitude may be a value equal to about 75 percent to 90 percent of a predetermined setting value. The operator observes the ammeter 41. The ammeter will go to a high value to indicate that the motors in the one or more attachment means in the upper and lower portions 23 and 25 are starting; then will subside to a relatively low value as they run to outwardly extend the attachment members, or feet 121, to engage the conduit 11. As the motors run to stall, the current indicated by ammeter 41 will go to the predetermined scalar magnitude corresponding to the setting of the rheostat 47, indicating that the motors have run to stall. Thereafter, the rheostat is moved to the setting value, or position effecting a current of a second predetermined scalar magnitude. The current will correspondingly increase, accompanied by a minor amount of outward movement of the free end of the feet 121 to engage the conduit with a greater force.

If desired, the elements of the tool may be made structurally stronger and the rheostat 47 moved directly to a setting value. In the latter event, the motors have a higher inertia and engage the feet 121 with the conduit more rigidly. There is an attendant greater danger of effecting structural damage by running the motor to stall at the higher current and without effecting preliminary engagement with the conduit with a lower force.

With the feet 121 engaged against the conduit, a stress is imparted to the conduit at the surface, as by rotating a kelly in a drill rig turntable, or by lifting upwardly on the kelly for inducing elongation stress and strain. The degree of movement, if any, of the respective points of attachment will be slightly different for the lower portion 25 and for the upper portion 23. Ordinarily, the upper portion 23 will move a greater distance than will the lower portion 25 if the conduit 11 is stuck at a point below the location of the downhole tool 21. Accordingly, the sensing means 29 will indicate relative movement between its rod member 63 and its tubular member 65, since the movable magnet 87 will be moved with respect to the sensing coil 89 and the fixed magnet 83. The relative movement will be indicated by the shifting of the DC volt meter 49 from its zero reference voltage as effected by the DC reference voltage source 57 nulling out the neutral position. It should be realized, of course, that the conduit can be stressed before the attachment means engage the attachment members. In the latter case, the movement, or strain, will be in the opposite direction.

There will be no relative movement if the conduit is stuck in the borehole at a point above the location of the borehole tool 21. The stress induced at the surface will be absorbed by the sticking components, such as the cave-in materials, at the point at which the conduit is stuck and there will be no attendant strain at the depth at which the borehole tool 21 is releasably connected with the conduit 11.

Once the determination is made that the conduit is still free for movement at the depth of the borehole tool 21, the rheostat 47 is run to zero and the switch 45 moved to the reversing position. The rheostat 47 is then moved to retract the attachment members 121. Again, the motors 113, or M1 and M2 in FIG. 10, are run to stall, effecting retraction of the feet 121. The borehole tool 21 is then lowered to a new predetermined depth and the operation repeated.

The borehole tool 21 may be moved to a plurality of locations and the attachment members moved outwardly to releasably interconnect the conduit and the respective upper and lower portions 23 and 25 any number of times on a single trip into the well and without returning to the surface.

In the event that power should fail to one or more of the motors 113, the borehole tool 21 may be removed by pulling upwardly on the cable means 19 with a sufficient force. The reason for this has been described hereinbefore. Briefly stated, it lies in the fact that a limit stop means such as spacer 157 prevents the feet 121 from attaining an angle $\alpha$ greater than 90°. Consequently, upward pull on the tool effects a relative downward force on the free end 165 of the feet 121. The resultant upward force on shaft 119 is sufficient to shear the shear pin 151 and allow the attachment members 121 to move freely, releasing the borehole tool 21 for being pulled to the surface.

One of the advantages of the present invention is that the automatic centralizer means 71 positions the rod member 63 such that a neutral position of the movable magnet 87 with respect to the sensing coil 89 and the fixed magnet 83 is always effected once the stress other than the force of gravity is released.

While an electric motor employing the screw and screw housing has been described for moving the shaft containing the rack 159 longitudinally of the borehole tool 21 to effect the pivotal movement of the feet 121, a hydraulically powered shaft 119 may be employed and a downhole power means drive a hydraulic pump to supply the requisite hydraulic pressure. The principles delineated hereinbefore are still applicable regardless of the type of power means employed, and regardless of the means employed to effect the pivotal movement of the feet outwardly to engage the conduit.

Figure 11:
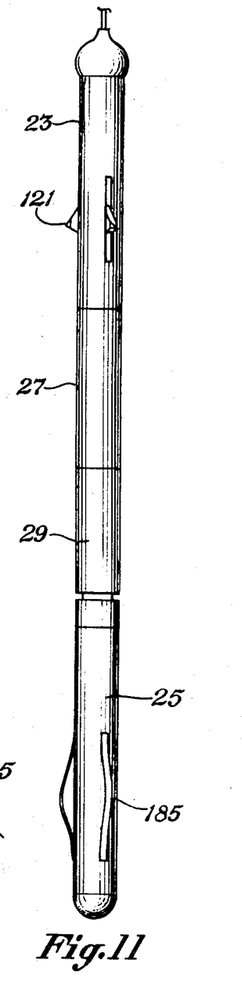
FIG. 11 is a side elevational view of another embodiment of this invention.

If desired, only one of the upper and lower portions, such as upper portion 23 in FIG. 11, may employ the attachment means for driving the feet 121 outwardly into engagement with the conduit. The other portion, such as lower portion 25, may employ conventional bow springs 185 for connecting the lower portion 25 with the conduit. In such a tool, the collar locator 27 and the sensing means 29 are employed as described hereinbefore.

The motor 113 has been described as a motor that is adapted to run to stall and keep a force applied, since this type motor effects an economical and preferred embodiment. If desired, however, the motor 113 may be run to position the feet 121 until they effect electric disconnect through appropriately located extension and retraction limit switch means.

It can be seen from the foregoing descriptive matter and drawings that the invention accomplishes the objects, and provides the features indicated to be desirable and not heretofore provided by the prior art devices.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. Apparatus for attaching to a conduit in a borehole comprising:
   a. surface equipment including attachment monitor means and attachment control means;
   b. cable means connected with said surface equipment for traversing into said borehole; said cable means having at least one electrical conductor and electrical ground means;
   c. borehole tool means physically and electrically connected with said cable means and adapted for traveling longitudinally of said conduit in said borehole; said borehole tool means including attachment means that is operable to engage and disengage a plurality of attachment members with said conduit at predetermined depths any number of times on a single trip traversing said conduit; said attachment means being remotely controlled by said attachment control means and adapted to provide an attachment force when engaging said attachment members with said conduit that is sufficient to effect movement of the portion of said borehole tool means in which said attachment members are located responsive to any movement of said conduit with which said attachment members are engaged regardless of the weight of said borehole tool, and apparatus bearing thereon and suspended therefrom; said attachment members being substantially nonrestrictive to flow of fluids therepast; said attachment means including downhole power means for supplying attachment force to said attachment members, and mechanical linkage means connecting said attachment members with said power means; said attachment members being disposed such that each attachment member when contacting said conduit produces reaction forces which are transferred to the other attachment members, so that a positive conduit gripping action is achieved.

2. The apparatus of claim 1 wherein said attachment control means is directly settable to provide a maximum force that is applied to set said attachment members in engagement with said conduit.

3. The apparatus of claim 1 wherein said attachment means is mechanical apparatus that is electrically powered and electrically controlled.

4. The apparatus of claim 1 wherein said attachment means is an electro-hydraulic apparatus that employs hydraulic pressure in hydraulically operable means in said tool and is powered and controlled electrically.

5. The apparatus of claim 1 wherein said attachment means is a hydraulic apparatus that employs hydraulic pressure in hydraulically operable means in said tool.

6. Apparatus for measuring the point at which a conduit is stuck in a borehole penetrating subterranean formations comprising:
   a. surface equipment including attachment monitoring means and attachment control means;
   b. cable means connected with said surface equipment and traversing into said borehole; said cable means having at least one electrical conductor and an electrical ground means;
   c. borehole tool means physically and electrically connected with said cable means and suspended within said conduit and adapted for being traversed longitudinally of said conduit in said borehole; said borehole tool means including upper and lower attachment means carried by respective upper and lower portions, said attachment means being operable to frictionally engage attachment members with said conduit with a force sufficient to effect responsive movement of the respective upper and lower portions concomitantly with movement of said conduit; said borehole tool means having a sensing means disposed intermediate said upper and lower portions, said sensing means also including a detector means that is responsive to stress induced in said conduit; at least one of said attachment means comprising an improved attachment means that is operable to engage and disengage a plurality of attachment members with said conduit at predetermined depths any number of times on a single trip traversing said conduit; said attachment means being remotely controlled by said attachment control means and adapted to provide an attachment force when engaging said attachment members with said conduit that is sufficient to support said borehole tool means and apparatus bearing thereon and suspended therefrom, in said conduit; said attachment members are substantially nonrestrictive to flow of fluids said improved attachment means including downhole power means for supplying attachment force to said attachment members, and mechanical linkage means connecting said attachment members with said power means; said attachment members being disposed such that each attachment member when contacting said conduit produces reaction forces which are transferred to the other attachment members, so that a positive conduit gripping action is achieved.

7. The apparatus of claim 6 wherein said attachment means is directly settable to provide a maximum force that is applied to set said attachment members in engagement with said conduit.

8. The apparatus of claim 6 wherein said improved attachment means is mechanical apparatus that is electrically powered and electrically controlled.

9. The apparatus of claim 6 wherein said improved attachment means is an electro-hydraulic apparatus that employs hydraulic pressure in hydraulically operable means in said tool and is powered and controlled electrically.

10. The apparatus of claim 6 wherein said attachment members in said improved attachment means are pivotally mounted with their free end extending away from said cable means; wherein limit stop means are provided for preventing said attachment members attaining an angle greater than 90° with respect to the longitudinal axis of said borehole tool means; said attachment members being connected with a power means in said improved attachment means via a shear pin that is shearable at a force less than that required to effect movement of said power means without power by said attachment members and less than the maximum longitudinal force that can be exerted by said cable means without failure; whereby said tool can be pulled upwardly to shear said shear pin and release said attachment members in said borehole tool in the event of failure of power to said power means in said attachment means.

11. The apparatus of claim 10 wherein said power means comprises an electric motor and rotates a screw, said attachment members have a gear means that is adapted to move the free end of said attachment members inwardly and outwardly in response to respective movement of a shaft that is connected therewith, said shaft and said screw being connected via a screw housing and said shear pin such that the free end of said attachment members is moved inwardly and outwardly in response to respective rotation of said screw by said motor; and wherein said limit stop means comprises a lower spacer means which stops downward movement of said screw housing before said shaft is moved downwardly to the extent that the free end of said attachment members is moved outwardly to attain an angle greater than said 90°.

12. The apparatus of claim 6 wherein said attachment means is a hydraulic apparatus that employs hydraulic pressure in hydraulically operable means in said tool.

13. A borehole tool comprising:
   a. an elongate body means adapted for traversing longitudinally of a conduit in a borehole penetrating subterranean formations;
   b. cable attachment means at the upper end of said body means for physically and electrically connecting with a cable means;
   c. attachment means, including attachment members, carried by said body means for attaching said body means to said conduit; said attachment members being pivotally mounted with their free end extending away from said cable attachment means; limit stop means for preventing said attachment members attaining an angle greater than 90° with respect to the longitudinal axis of said borehole tool; power means in said attachment means; said attachment members being connected with said power means via a shear pin that is shearable at a force less than that required to effect movement of said power means without power by said attachment members and less than the maximum longitudinal force that can be exerted by said cable attachment means without failure; whereby said tool can be pulled upwardly to shear said shear pin and release said attachment members and said borehole tool in the event of failure of power to said power means in said attachment means.

14. The borehole tool of claim 13 wherein said cable attachment means in said borehole tool is connected with a cable that is connected with surface equipment; said power means comprises an electric motor rotating a screw, said attachment members have a gear means that is adapted to move the free end of said attachment members inwardly and outwardly in response to respective movement of a shaft that is connected therewith, said shaft and said screw being connected via a screw housing and said shear pin such that the free end of said attachment members is moved inwardly and outwardly in response to respective rotation of said screw by said motor, said motor being controlled from the surface via an attachment control means.

* * * * *